(12) United States Patent
Hong

(10) Patent No.: US 11,486,630 B2
(45) Date of Patent: Nov. 1, 2022

(54) REFRIGERATOR BASED ON ARTIFICIAL INTELLIGENCE AND METHOD OF CONTROLLING THE SAME

(71) Applicant: LG ELECTRONICS INC., Seoul (KR)

(72) Inventor: Seungbum Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 575 days.

(21) Appl. No.: 16/485,320

(22) PCT Filed: May 31, 2019

(86) PCT No.: PCT/KR2019/006600
§ 371 (c)(1),
(2) Date: Aug. 12, 2019

(87) PCT Pub. No.: WO2020/241949
PCT Pub. Date: Dec. 3, 2020

(65) Prior Publication Data
US 2021/0262725 A1   Aug. 26, 2021

(51) Int. Cl.
*G06F 17/00* (2019.01)
*F25D 25/00* (2006.01)
*G05B 13/02* (2006.01)

(52) U.S. Cl.
CPC ........... *F25D 25/00* (2013.01); *G05B 13/027* (2013.01)

(58) Field of Classification Search
CPC ...... F25D 25/00; F25D 25/005; F25D 29/006; F25D 27/00; F25D 2400/361; F25D 29/008; F25D 2500/06; F25D 25/024; F25D 27/005; F25D 2700/02; G05B 13/027; G06Q 10/087; E05B 47/00; G06N 3/02
See application file for complete search history.

(56) References Cited

U.S. PATENT DOCUMENTS

| 9,696,084 B1* | 7/2017 | Kalva | F25D 23/025 |
| 2012/0101876 A1* | 4/2012 | Turvey | G06Q 40/00 705/14.1 |
| 2012/0217254 A1* | 8/2012 | Cho | F25D 29/00 220/592.02 |
| 2012/0260683 A1* | 10/2012 | Cheon | F25D 29/005 62/125 |
| 2013/0111936 A1* | 5/2013 | Olson | F25D 23/028 62/127 |

(Continued)

FOREIGN PATENT DOCUMENTS

| CN | 103994631 A | 8/2014 | |
| EP | 1980807 A2 * | 10/2008 | ............. F25D 29/00 |

(Continued)

*Primary Examiner* — Tuyen K Vo
(74) *Attorney, Agent, or Firm* — Birch, Stewart, Kolasch & Birch, LLP

(57) ABSTRACT

Disclosed herein is a method of controlling an intelligent refrigerator, the method including: obtaining registration information of food comprising an expiration date; storing the registration information; and comparing an expiration date of foods stored in the refrigerator with a current date based on the registration information and visually indicating an alarm on the food, if the remaining days to the expiration date are smaller than a predetermined threshold value.

18 Claims, 15 Drawing Sheets

(56) References Cited

U.S. PATENT DOCUMENTS

| | | | |
|---|---|---|---|
| 2015/0260447 A1* | 9/2015 | Kim ........................ | G08B 5/36 |
| | | | 312/405 |
| 2016/0086146 A1* | 3/2016 | Brown ................. | G06Q 10/087 |
| | | | 705/14.27 |
| 2016/0209109 A1* | 7/2016 | Park ...................... | F25D 27/005 |
| 2016/0273750 A1* | 9/2016 | Burke ................... | F21V 23/002 |
| 2016/0281959 A1* | 9/2016 | Khizar ................ | A47L 15/4246 |
| 2018/0196403 A1* | 7/2018 | Lagares-Greenblatt ..................... | |
| | | | G06Q 50/00 |
| 2018/0363966 A1* | 12/2018 | Hottenroth ............ | F25D 23/025 |
| 2019/0128596 A1* | 5/2019 | Gmeinder .............. | G01D 5/142 |
| 2019/0170434 A1* | 6/2019 | Kim ...................... | F25D 23/028 |
| 2021/0325106 A1* | 10/2021 | Marinello ............. | F25D 23/085 |

FOREIGN PATENT DOCUMENTS

| | | |
|---|---|---|
| JP | 2003-90661 A | 3/2003 |
| JP | 2017-133825 A | 8/2017 |
| KR | 10-2006-0122596 A | 11/2006 |
| KR | 10-2017-0053248 A | 5/2017 |

* cited by examiner

Fig. 10

Receipt

No.180121-0101-0353-01

281-21-00040              TEL)02 555-5551
Address: kyoungki yongsansi giheunggu
Table No.:001           order staff: manager
Date:2018-01-21              Time:21:12:35

| items | amount | confirm | Price |
|---|---|---|---|
| cabbage | 1 | | 4,500 |
| onion | 2 | | 9,800 |
| carrot | 1 | | 5,900 |

28,600
26,002
2,598
0
28,600 cashier :manager

[card No.] 8852-1235-487-5688
[installment] 0
[card company]  DAEHAN
[approval No.] 079851241
[amount] 28,600 WON

REFRIGERATOR BASED ON ARTIFICIAL INTELLIGENCE AND METHOD OF CONTROLLING THE SAME

CROSS REFERENCE TO RELATED APPLICATIONS

This application is the National Phase of PCT International Application No. PCT/KR2019/006600, filed on May 31, 2019, which is hereby expressly incorporated by reference into the present application.

TECHNICAL FIELD

The present invention relates to a refrigerator based on artificial intelligence and a method of controlling the same.

BACKGROUND ART

A refrigerator is an electronic product that is used to store foods in a fresh state for a long period of time. However, in a case of a refrigerator that has been used to store foods, it is practically impossible for a user to check an expiration date or a condition of the stored foods unless he/she opens a door of a refrigerator and checks the stored foods again.

DISCLOSURE

Technical Problem

An embodiment of the present invention provides a refrigerator and a control method thereof capable of easily managing an expiration date of foods stored in a refrigerator.

Technical Solution

Furthermore, in this specification, there is provided a method of controlling an intelligent refrigerator, the method including: obtaining registration information of food comprising an expiration date; storing the registration information; and comparing an expiration date of foods stored in the refrigerator with a current date based on the registration information and visually indicating an alarm on the food, if the remaining days to the expiration date are smaller than a predetermined threshold value.

The registration information may be obtained through at least one of a photographed image of the food, data input through a user input unit of the refrigerator, data input through a bar code, or data obtained through an external system that manages distribution information of the food.

The expiration date may be set to a value input through the user input unit when the expiration date is not determined in the image.

The bar code may be included in wrapping paper of the food or a receipt in which a purchase history of the food is recorded.

The obtaining of registration information may include: obtaining data comprising a name and an expiration date of the food; displaying the obtained data in a display unit of the refrigerator; and receiving an input of modified data in which the obtained data are modified through a user input unit of the refrigerator to store the modified data as the registration information in a memory.

The control method may further include: receiving an request for updating the expiration date of the food in which the alarm is displayed through a user input unit; determining whether the expiration date of the food can be updated; and changing the expiration date of the food to the requested date based on the determining.

The visually indicating of an alarm may include detecting opening of a door of a storage in which the food is stored and turning on a light installed in the storage.

The storage may be partitioned into a plurality of storage compartments partitioned by shelves, and a light installed to correspond to a storage compartment in which the food is stored among a plurality of lights installed to correspond to each of the plurality of storage compartments may be selectively turned on.

The light may be turned on with different colors based on the remaining days of the food.

The refrigerator may include a plurality of storage boxes for separately storing the food and an indicator installed between the plurality of storage boxes so as to guide a receiving position of the storage box, and the visually indicating of an alarm may include controlling to turn on the indicator based on the remaining days.

The indicator may be controlled to turn on when the storage box is deviated from the receiving position, and turn off when the storage box is positioned at the receiving position.

The control method may further include: receiving a user's authentication information and performing user authentication of comparing the user's authentication information with the user's authentication information registered in advance to correspond to each of the storage boxes; and releasing lock of a door of the refrigerator and the storage box corresponding to the authenticated user according to the user authentication.

The threshold value may be differently set based on at least one of a kind of the food, a consumption speed of the food, and a weight of the food.

Furthermore, in this specification, there is provided an intelligent refrigerator for storing food, the intelligent refrigerator including: a memory for storing data; and a processor for controlling an operation of the refrigerator, in which the processor is operated to: obtain registration information of food comprising an expiration date, store the registration information in the memory, and compare an expiration date of foods stored in the refrigerator with a current date based on the registration information and visually indicate an alarm of the food, if the remaining days to the expiration date are smaller than a predetermined threshold value.

Advantageous Effects

The present invention has an advantage in that since the foods stored in the refrigerator are stored linked with the expiration date of foods, a user can easily know what foods are currently stored in the refrigerator and easily know the expiration date of the stored foods, thereby efficiently managing the foods stored in the refrigerator.

DESCRIPTION OF DRAWINGS

FIG. 10 is a diagram illustrating a receipt including a bar code.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
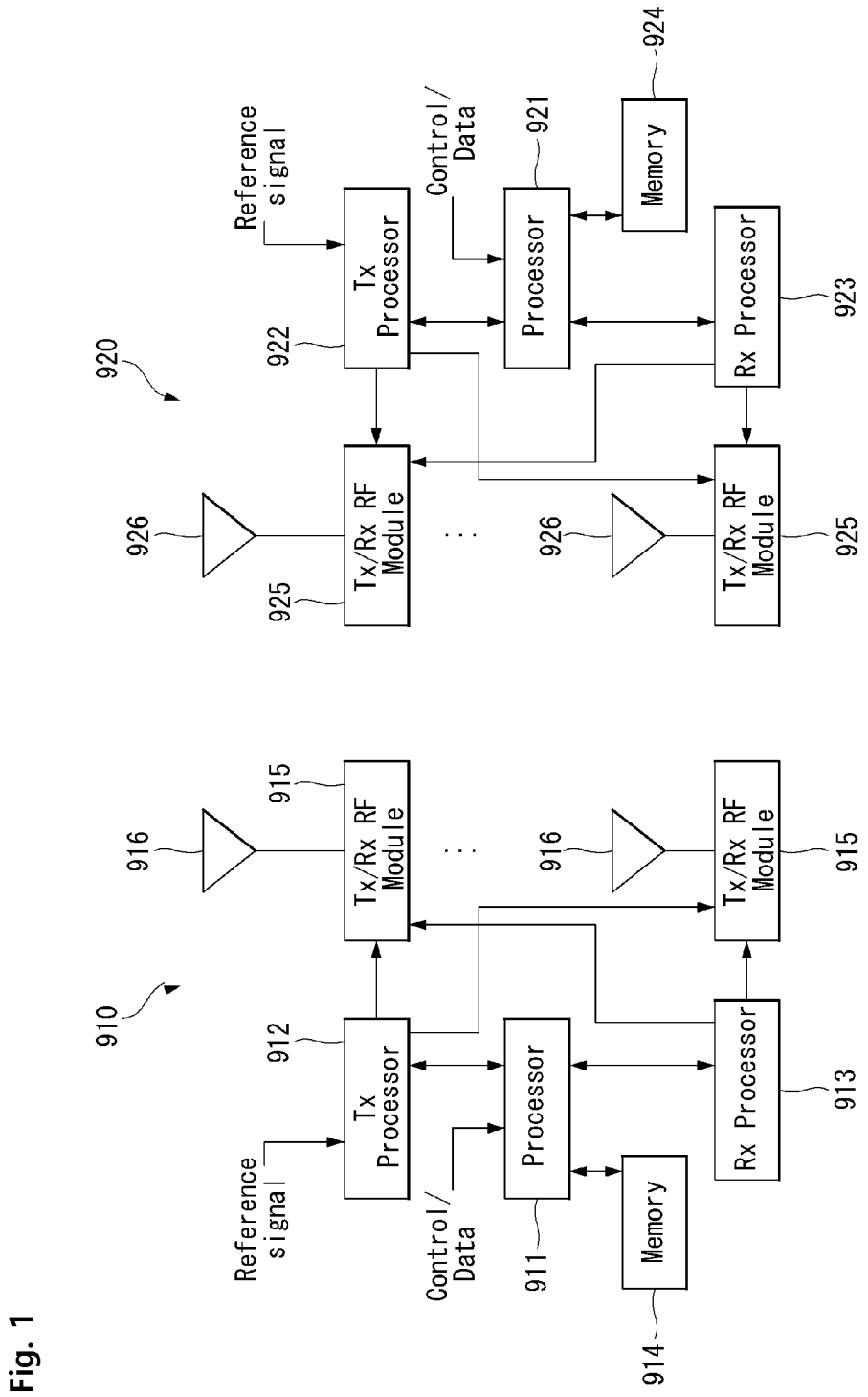
FIG. 1 illustrates a block configuration diagram of a wireless communication system to which methods proposed herein may be applied.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
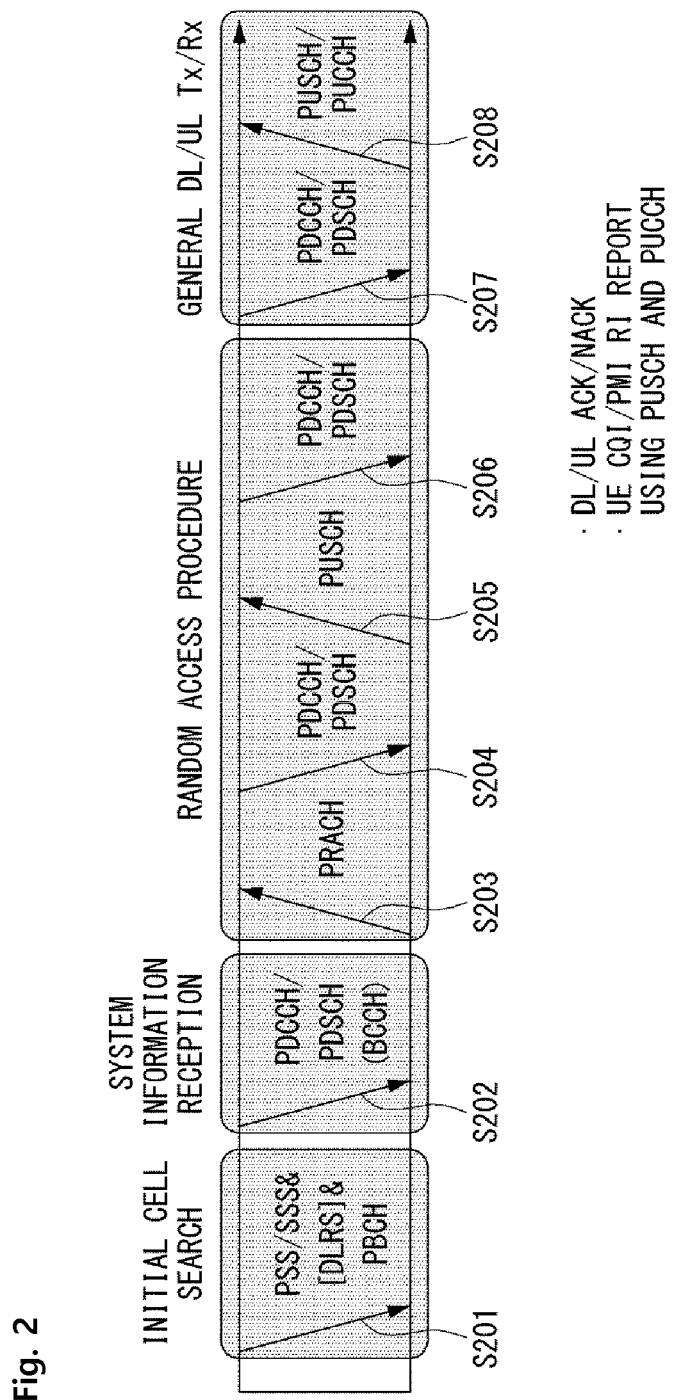
FIG. 2 is a diagram illustrating an example of a 3GPP signal transmission/reception method.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
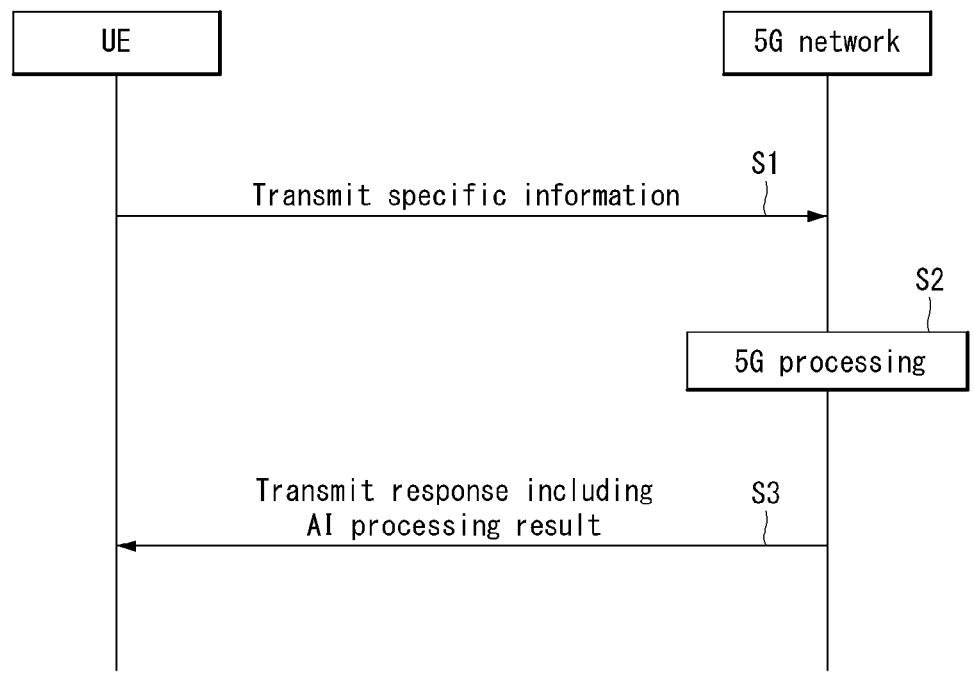
FIG. 3 is a diagram illustrating an example of a basic operation of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
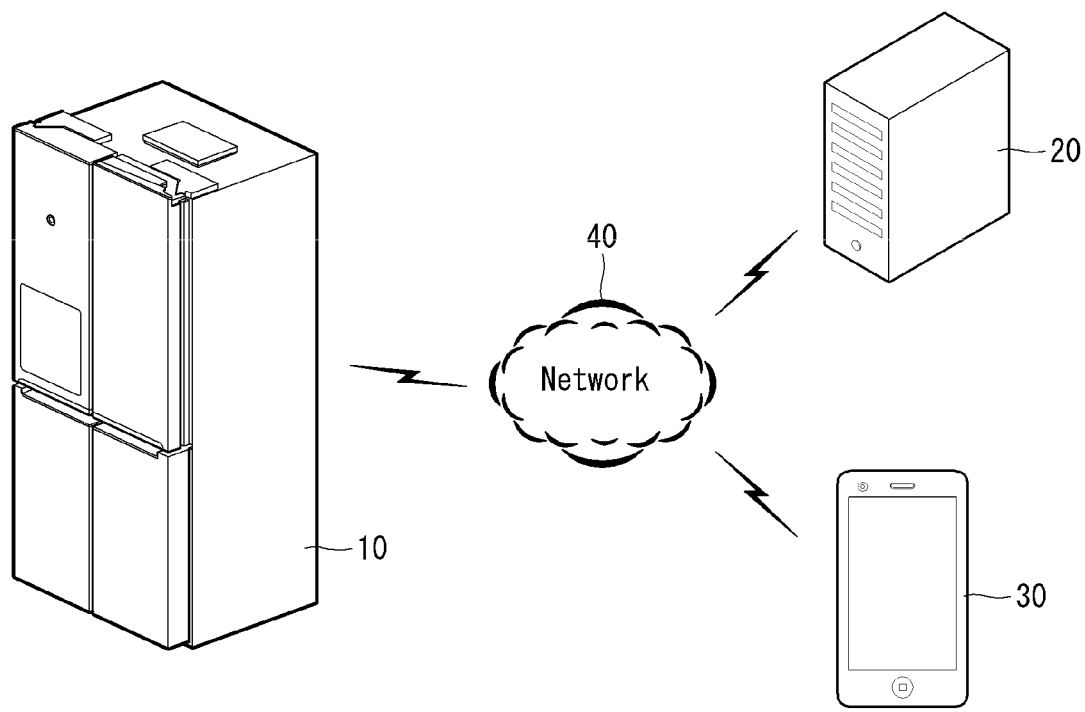
FIG. 4 is a system configuration diagram of a refrigerator operating based on a 5G network.

FIG. 4 illustrates a schematic configuration of a system implemented to enable 5G communication between components based on the above-mentioned 5G communication technologies.

Referring to FIG. 4, the present invention can be implemented based on the above-mentioned 5G communication technology, and super speed data communication having a delay time of substantially 1 to 3 ms can be implemented between a refrigerator 10, a server 20, and a user terminal 30 based on the 5G communication.

The present invention can be implemented under a system in which the refrigerator 10, the server 20, and the user terminal 30 are connected to a network 40 implemented according to the above-described 5G communication technology so as to enable data communication.

The server 20 may be a background server which is configured to process data according to a request transmitted from the user terminal 30 or the refrigerator 10 and transmit the processed result to the user terminal 30 or the refrigerator 10 requesting the data processing. The server 20 is connected to the user terminal 30 and the refrigerator 10 via the network 40 to which the 5G communication technology is applied as described above.

In addition, the server 20 performs arithmetic processing according to speech recognition or artificial intelligence based on the information received from the user terminal 30 or the refrigerator 10 via the network 40 and transmits the result to the user terminal 30 or the refrigerator 10 requesting the data processing. Alternatively, a module (or engine) for speech recognition or artificial intelligence may be embedded in the user terminal 30 and/or the refrigerator 10.

The user terminal 30 is an electronic device which is configured to request or receive data processing to or from the server 20 or the refrigerator 10 via the network 40 and provide the corresponding functions and may be a smartphone, a laptop computer, a notebook computer, a smart TV, a wearable device and the like in which the functions are embedded. In order that the user terminal 30 is connected to the network 40 to transmit or receive certain specific instructions, messages or the like, the user terminal 30 may be registered in the network 40 through a predetermined procedure so as to be connected to the network in advance.

On the other hand, FIG. 4 illustrates that the user terminal 30 may be communicably connected to the refrigerator 10 via the network 40, but the user terminal 30 may be connected to the refrigerator 10 via a local area network, for example, WiFi.

The refrigerator 10 may be configured to include sensors installed therein. These sensors help to obtain necessary information on foods stored in the refrigerator. These sensors include at least one of, for example, a temperature sensor, an odor sensor, a pressure sensor, a load sensor, a position sensor, an optical sensor and the like, and may be configured to obtain desired information by combining these sensors, if necessary.

In addition, the refrigerator 10 may include one or more cameras installed inside/outside thereof, in which the camera may be operated to photograph the inside of the refrigerator every time a specific condition is satisfied so as to obtain an image of the inside of the refrigerator at the photographing timing and obtain information necessary for arithmetic processing such as a state, a type, and the number of foods stored in the refrigerator through the obtained image. In a preferred example, the camera may be operated to obtain necessary data in combination with the sensors.

A control method according to an embodiment of the present invention described below can be performed by an operation in which the refrigerator 10, the server 20, and the user terminal 30 are connected to each other, and it is to be understood that the following description is only based on one embodiment and the present invention is not limited to the method In addition, it should be noted that the following description is merely for convenience of explanation and an operation flow executed in each of the refrigerator 10, the server 20, and the user terminal 30 is merely an illustrative example and the present invention is not limited to the illustrative example.

Figure 5:
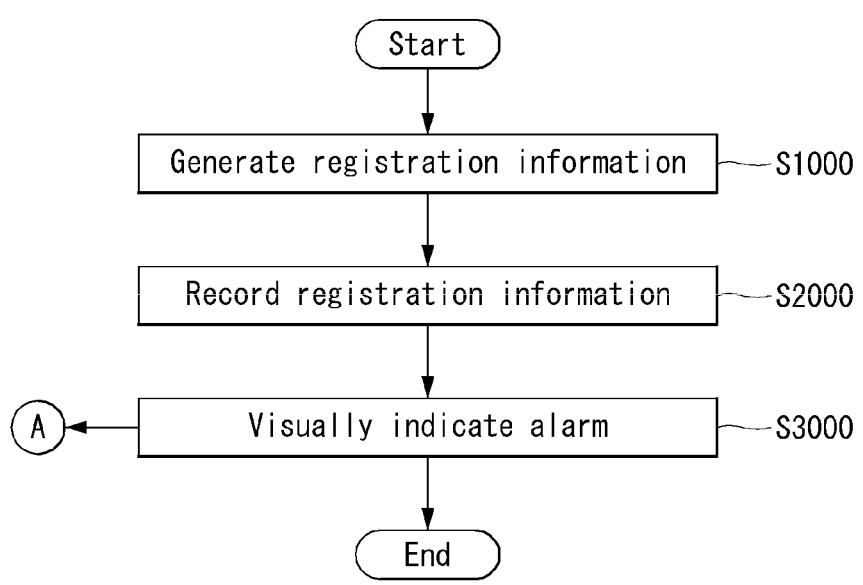
FIG. 5 is a flowchart illustrating a method of controlling a refrigerator according to an embodiment of the present invention.

FIG. 5 is a flowchart illustrating a method of controlling a refrigerator according to an embodiment of the present invention.

In FIG. 5, a method of controlling a refrigerator according to an embodiment of the present invention includes obtaining registration information (S1000), storing the registration information in a memory (S2002), and comparing an expiration date of foods stored in the refrigerator with a current date based on the registration information and visually indicating an alarm on the food if it is determined based on the comparison result that the remaining days to the expiration date is smaller than a predetermined threshold value (S3000). Here, the alarm is an indication to draw attention of the user, and may be displayed in order to draw attention of a user in association with the expiration date of the stored foods.

In the obtaining of the registration information (S1000), the expiration date of the recognized food is obtained, the obtained expiration date is linked with the corresponding food, and the registration information is generated, in which the registration information may include a type and an expiration date of foods and may selectively include user information as well. In this specification, the expiration date refers to a period of time during which a person can eat food safely, and may be generally interpreted as referring to an expiration date printed on wrapping paper during production and package of food.

In one example, the registration information may be data obtained through an external system which manages distribution information on food. In order to manage the distribution information on food, the external system may record and store the distribution information including a name and an expiration date of food. In the present invention, the distribution information recorded in the external system may be read and generated as the registration information. In this case, food may have information including an identifier. At this stage, a name and an expiration date of the corresponding food recorded in the external system can be obtained through the identifier.

In one embodiment of the present invention, there may be provided various tools that enable a user to directly input what foods are stored. As an example, advanced tools such as speech recognition and artificial intelligence may be provided.

In the storing of the registration information (S2000), the registration information is stored in the memory of the refrigerator 10 or in the server 20 connected to the refrigerator 10 via the network 40, in which the expiration date of foods stored in the refrigerator may be managed based on the registration information.

The visually displaying of the alarm on the stored foods (S3000) may be performed based on the stored registration information. The expiration date of foods stored in the refrigerator is extracted from the registration information, the expiration date is compared with the current date (or today's date), and the alarm is visually indicated for the corresponding food having the comparison result smaller than the threshold value.

Here, the threshold value may be a value directly set by a user or a value designated as a default. More preferably, the threshold value may be a different value depending on the type of food. For example, fresh foods may have a threshold value set shorter than that of frozen foods, and processed foods may have a threshold value set longer than that of unprocessed foods.

In addition, the threshold value can vary depending on a consumption rate of the stored foods. As an example, the consumption rate of the stored foods may be obtained as the amount of consumption per day like 20 g/day by combining the image photographed by the camera and the load sensor measuring a weight of food according to the order of time. Food with a high consumption rate will have a threshold value set shorter than that of food with a low consumption rate.

Alternatively, the threshold value may be differently set for each food based on the weight of foods. The weight of food can be obtained through the load sensors installed in the refrigerator corresponding to each of the compartments in which foods are stored, and foods with the relatively smaller weight can be expected to be consumed as fast as that.

Alternatively, the threshold value may be a value set as a value input through a user input unit regardless of the types of foods.

In this step S3000, the alarm may be provided in two ways. First, the alarm may be indicated by outputting a message to the user terminal 30 or the display unit 21 and may be indicated through a light as another form.

In this step S3000, the refrigerator 1000 periodically compares the expiration date of stored foods with the current date based on the registration information, and visually displays an alarm on the corresponding food if it is determined based on the comparison result that the remaining days to the expiration date is smaller than a predetermined threshold value, and the refrigerator 10 may provide the alarm differently depending on whether the doors 20 and 30 are opened or closed.

Figure 13:
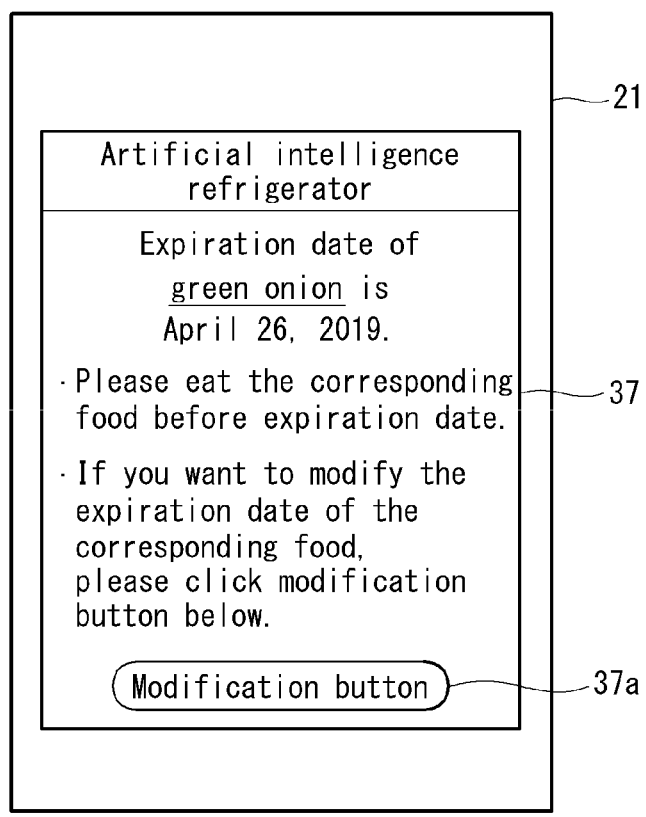
FIG. 13 is a diagram illustrating a notification message displayed on the user terminal.

If it is determined that the doors 20 and 30 of the refrigerator 10 are closed, the refrigerator 10 may be operated to generate a message illustrated as in FIG. 13 and provide an alarm to the user terminal 30, and if it is determined that the doors 20 and 30 of the refrigerator is open, may be operated to provide an alarm to a user by turning on a light installed to correspond to a storage compartment. This part will be described in detail below.

Hereinafter, the refrigerator 10 according to the embodiment of the present invention will be described with reference to FIGS. 6 to 7. In the embodiment of the present invention, the refrigerator 10 may be configured to enable a speech recognition processing based on a 5G network and arithmetic processing based on artificial intelligence, or these functions may also be implemented in a server terminal. In the present specification, it is assumed that the arithmetic processing based on the AI is performed on the server 20 for convenience of explanation.

Figure 6:
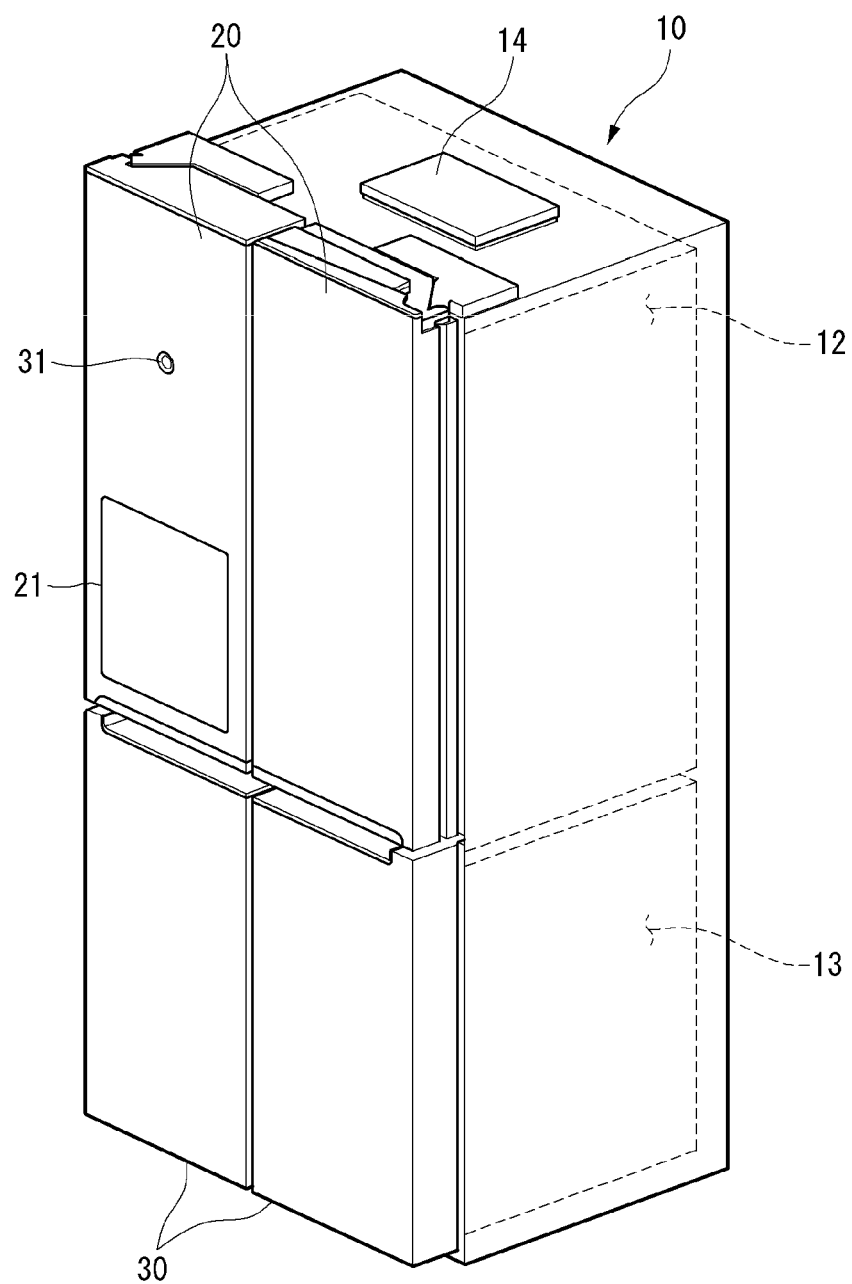
FIG. 6 is a diagram illustrating an overall appearance of the refrigerator according to an embodiment of the present invention.
Figure 7:
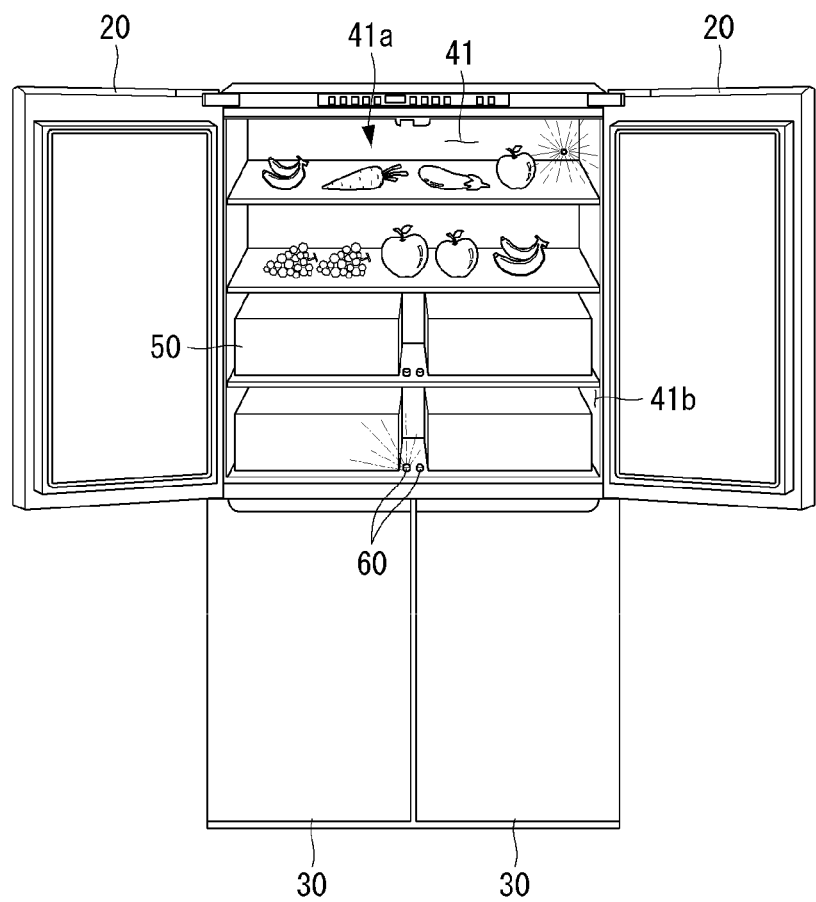
FIG. 7 is a view illustrating an inside of the refrigerator by unfolding a door of a refrigerator.
Figure 8:
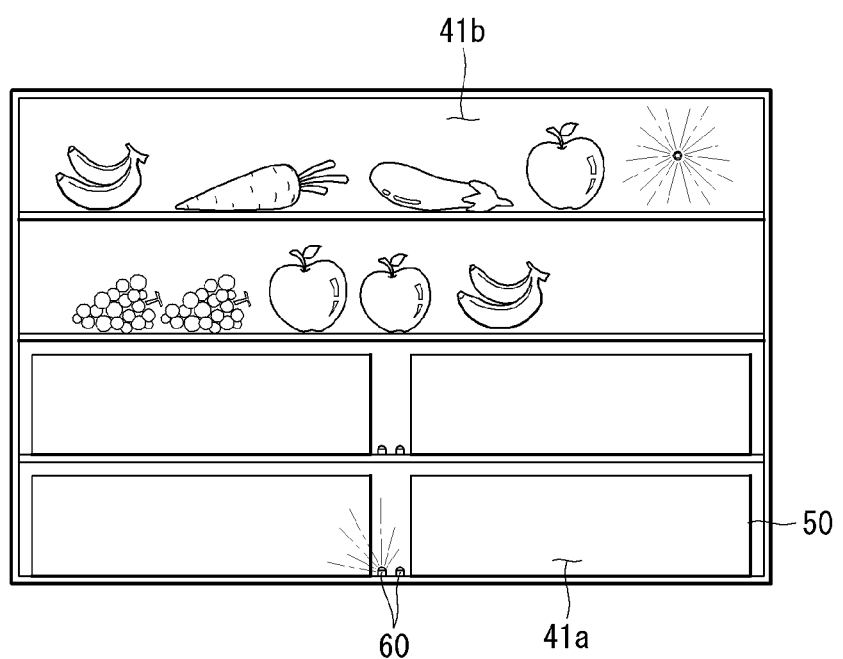
FIG. 8 is a diagram selectively illustrating an inside of the refrigerator chamber.

Referring to FIGS. 6 to 7, the refrigerator 10 may include a door 20, 30 which have a partitioned storage and are installed at entrances of each storage to open or close the storages.

A processor 14 for controlling the overall operation of the refrigerator 10 may be positioned at one side of a main body thereof. The processor 14 which is responsible for the arithmetic processing for the operation control according to the embodiments of the present invention is responsible for a series of arithmetic processing associated with user authentication and the implementation of the above-mentioned control method as well as a series of arithmetic processing required to store and manage foods so as to perform a necessary interacting operation with the server 20 or the user terminal 30 or control the operation of the refrigerator 10.

The storage may be a storage chamber including a refrigerator chamber 12 and a freezer chamber 13. The positions of the refrigerator chamber 12 and the freezer chamber 13 are not limited to those shown, and can be variously changed. The refrigerator chamber 12 and/or the freezer chamber 13 may be configured to include a plurality of storage compartments 41 partitioned into a plurality of storage compartments by a shelf, and include lights (not illustrated) installed to correspond to each storage compartments 41. A variety of lights can be used without any particular limitation as long as the light can emit light in various colors. As an example, the light may be an LED light whose operation can be controlled.

In one preferred embodiment, the storage compartments 41 may be configured to include a personal storage compartment 41*b* with a limited user access and a shared storage compartment 41*a* with an unlimited user access.

The personal storage compartment 41*b* can be particularly useful when a large number of users use the refrigerator. In an embodiment of the present invention, some of the storage compartments 41 are configured to include the personal storage compartment 41*b*, but the present invention is not limited thereto. Therefore, the storage compartments 41 may be variously configured according to the selection. As an example, the whole refrigerator may be configured to have only the personal storage compartments or may be configured to have only the shared storage compartments.

The personal storage compartment 41*b* may be locked to be used by only one authorized and registered user. In contrast, the shared storage compartment 41*a* can be configured to be accessed by all users.

Alternatively, the refrigerator 10 may also be configured to have the locked doors 20 and 30 so that only some authenticated specific users can access the refrigerator. A user needs to be registered as a user of a refrigerator through a user registration process. In order to use the refrigerator, the doors 20 and 30 of the refrigerator 10 can be controlled to be opened or closed only when the user is confirmed as a user of the refrigerator through the user authentication process.

The personal storage compartment 41*a* and the shared storage compartment 41*b* will be described in more detail with reference to FIG. 7. FIG. 7 illustrates that the refrigerator chamber is partitioned into four spaces, in which the lower two compartments are the personal storage compartments 41*b*, and the two compartments above the individual storage compartment 41*b* are the shared storage compartments. Such a configuration is illustrative merely for explanation, but the present invention is not limited thereto The personal storage compartment 41*b* may be configured to include a storage box 50 in which a user can store articles only when the user is authenticated through user authentication. The storage box 50 can be locked so that only the authorized user accesses the personal storage compartment 41*b* to take the storage box 50 out of the personal storage compartment 41*b*, or/and a door of the storage box 50 may be locked.

The storage box 50 may be locked to distinguish users using the user authentication obtained through the authentication process for opening the doors 20 and 30 of the refrigerator 10, such that it is possible to control only the corresponding registered user to access the storage box 50.

In contrast, the shared storage box 41 is not locked, and as a result may be accessed by all users.

Further, the storage compartments 41*a* and 41*b* may be configured to further include lights installed to correspond to the storage compartments, and the lights may be configured to emit light in accordance with the control operation. The light can be turned on for a visual alarm based on the expiration date of foods stored in the storage compartment.

Meanwhile, the personal storage compartment 41*a* including the storage box 50 may further include an indicator 60 for guiding the storage position of the storage box 50, and the indicator 60 may emit light according to the selection.

In one example, the indicator 60 can be turned on when the storage box 50 is out of the storage position to emit light, and can be controlled to be turned off when the storage box 50 is received in the storage position. In addition, the indicator 60 may also be turned on depending on the expiration date of foods contained in the storage box 50.

The display unit 21 may be provided on one side outside the door 20 of the refrigerator chamber or the door 30 of the freezer compartment. FIG. 7 illustrates that the display unit 21 is provided on one side of the chamber 20 of the refrigerator chamber, but the technical idea of the present invention is not limited thereto. The display unit 21 may function as an interface which allows a user to transmit necessary instructions to the refrigerator 10 or displays a series of messages or information processing results received from the refrigerator 10, the user terminal 30, and the server 20 via the network 40.

In addition, a camera 31 may further be installed outside the doors 20 and 30 of the refrigerator. The camera 31 may be operated to obtain a face image of a user required for the user authentication, a food image in the case of the food storage, a gesture image in the case of receiving an instruction by a gesture operation and the like.

In addition, an optical scanner (not illustrated) may further be installed outside the doors 20 and 30 of the refrigerator. The optical scanner may be operated to read an identifier, for example, a bar code, displayed on the wrapping paper of the food so as to obtain the type and expiration date of foods. The information collected through the optical scanner may be transmitted to a control board 14 and used to generate the registration information. On the other hand, the optical scanner which is a functional module to be programmed may be configured so that the display portion 21 or the camera 31 is responsible for a function of the optical scanner.

Figure 9:
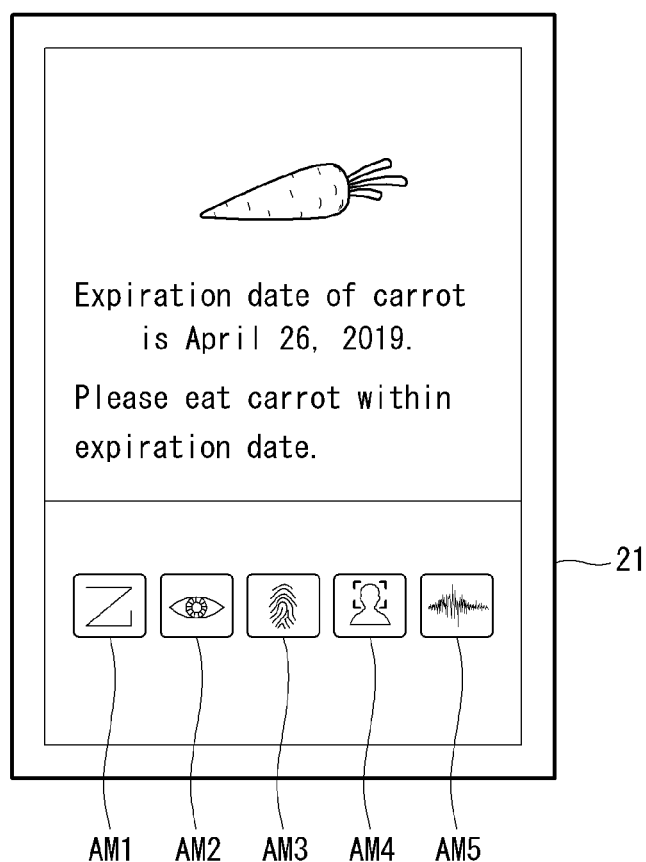
FIG. 9 is a diagram illustrating an appearance of a display unit.

On the other hand, as illustrated in FIG. 9, the display unit 21 may be operated to display information associated with the foods stored in the refrigerator, for example, the expiration date matched with the stored foods, or visually display (for example, light emission of the indicator described above) a display state of the personal storage compartments depending on the situation where the personal storage compartments are occupied and whether or not the personal storage compartments are locked so as to notify a user of available storage compartments through the authentication.

In addition, the display unit 21 may provide various interfaces for the user authentication. For example, the authentication interface includes a module AM2 for a user's iris, a module AM3 for recognizing a user's fingerprint, a module AM4 for recognizing a user's face, a module AM5 for recognizing a user's voice, a module AM1 for recognizing a specific pattern and the like.

If any one of the modules is selected, the selected module is activated to request and obtain, from a user, information on the user's iris in the case of iris recognition, information on the user's fingerprint in the case of fingerprint recognition and the like as an example of the corresponding authentication means, compare the obtained authentication information with the pre-stored user authentication information so as to determine whether the user is a registered user, and unlock the doors 20 and 30 of the refrigerator according to the determination result. Such a user authentication process can be processed in the server 20 via the network 40 capable of high-speed data communication, or can be processed in the refrigerator 10.

Hereinafter, it will be described in detail how the control method of the present invention described above is implemented using the refrigerator configured as described above.

First, among the control methods according to the present invention, a method of registering food stored in a refrigerator in the refrigerator (in step S1000) (acquisition of registration information in the standpoint of the refrigerator) will be described. In the examples of the present invention, the registration information of the foods stored in the refrigerator 10 is acquired based on the artificial intelligence, the registration information input from the display unit 21 or the user terminal 30, or the speech recognition. Here, the registration information may include a name of food to be stored and an expiration date of the stored foods to help to effectively manage the food stored in the refrigerator 10.

The camera 31 installed outside the refrigerator 10 may acquire an image of food to be stored by the user and the acquired image may be transmitted to the server 20 via the network 40. The image transmitted to the server 20 may be stored in the memory (not illustrated) as the registration information by extracting the name and the expiration date of food from the image obtained through the arithmetic processing in the AI module and transmitting the resultant value to the refrigerator 10 via the network 40.

Meanwhile, the AI module may be configured to include a plurality of modules capable of performing the AI processing. The AI module described below can be configured as a part of the server or the refrigerator.

The AI processing may include all operations for the data arithmetic processing described below. For example, the AI module may perform processing/determination and control signal generation operations by performing the AI processing on the sensed data or the acquired data. In addition, for example, the received data can be AI processed to control intelligent electronic devices.

The AI module may be a client device which directly uses the AI processing result, or a device in cloud environment which provides the AI processing result to other devices.

The AI module is a computer which can learn a neural network and can learn the neural network using programs stored in a memory. In particular, the AI module can learn the neural networks to recognize data related to image analysis and speech recognition. Here, the neural network may be designed to simulate a human brain structure on a computer, and may include a plurality of network nodes which simulate neurons of a human neural network and have a weight. The plurality of network modes can transmit and receive data according to the respective connection relationships so that the neurons simulate synaptic activity of the neurons transmitting and receiving signals through a synapse. Here, the neural network may include a deep learning model developed in a neural network model. In the deep learning model, a plurality of network nodes are located on different layers and can transmit and receive data according to a convolution connection relationship. Examples of the neural network model include various deep learning techniques such as a deep neural network (DNN), a convolutional deep neural network (CNN), a recurrent Boltzmann machine (RNN), a restricted Boltzmann machine (RBM) a deep belief network (DBN), and a deep Q-network.

Meanwhile, the AI module performing the functions as described above may be a general purpose processor (for example, CPU), but may be an AI dedicated processor (for example, GPU) for artificial intelligence learning.

Meanwhile, the AI module may include a data learning unit which learns a neural network for data classification/recognition. The data learning unit can learn a criterion on what learning data are used and how to classify and recognize data using learning data so as to determine the data classification/recognition. The data learning unit acquires learning data to be used for learning, and applies the obtained learning data to the deep learning model, thereby making it possible to learn the deep learning model.

The data learning unit may be manufactured in the form of at least one hardware chip and mounted on the AI module. For example, the data learning unit may be manufactured in the form of a dedicated hardware chip for artificial intelligence (AI), or manufactured as part of a general-purpose processor (CPU) or a graphics-only processor (GPU) and mounted on the AI module. Further, the data learning unit may be implemented by a software module. When the data learning unit is implemented in the software module (or a program module including an instruction), the software module may be stored in computer-readable non-transitory computer readable media. In this case, at least one software module may be provided by an operating system (OS) or provided by applications.

The data learning unit may include a learning data acquisition unit and a model learning unit.

The learning data acquisition unit can acquire learning data necessary for a neural network model for classifying and recognizing data. For example, the learning data acquisition unit may acquire, as learning data, vehicle data and/or sample data for input to the neural network model.

The model learning unit can perform learning using the obtained learning data so that the neural network model has a determination criterion as to how to classify predetermined data. At this time, the model learning unit can learn the neural network model through supervised learning using at least some of the learning data as a determination criterion. Alternatively, the model learning unit 24 can learn the neural network model through unsupervised learning finding the determination criterion by performing learning by itself using the learning data without supervision. In addition, the model learning unit can learn the neural network model through reinforcement learning using feedback on whether the result of the situation determination based on the learning is correct. In addition, the model learning unit 24 can learn a neural network model using a learning algorithm including error back-propagation or gradient decent.

When the neural network model is learned, the model learning unit can store the learned neural network model in a memory. The model learning unit may store the learned neural network model in the memory of the AI module and the server connected to the wired or wireless network.

The data learning unit may further include a learning data preprocessing unit and a learning data selection unit to improve the analysis result of the recognition model or to save resources or time required for generation of the recognition model.

The learning data preprocessing unit can preprocess the obtained data so that the acquired data can be used for learning for the situation determination. For example, the learning data preprocessing unit can process the obtained data into a predetermined format so that the model learning unit can use the learning data obtained for learning for the image recognition.

The learning data selection unit may select data required for learning out of the learning data obtained by the learning data acquisition unit or the learning data preprocessed by the preprocessing unit. The selected learning data may be provided to the model learning unit. For example, the learning data selection unit can select only data for objects included in a specific area as learning data by detecting the specific area in the image obtained through the camera of the intelligent electronic device.

In addition, the data learning unit may further include a model evaluation unit for improving the analysis result of the neural network model.

The model evaluation unit may input evaluation data to the neural network model and allow the model learning unit to perform learning again when the analysis result output from the evaluation data does not satisfy a predetermined criterion. In this case, the evaluation data may be predefined data for evaluating the recognition model. For example, when the number or ratio of evaluation data with incorrect analysis results among the analysis results of the learned recognition model for the evaluation data exceeds a preset threshold value, the model evaluation unit may evaluate that the predetermined criterion is not satisfied.

In addition, the result value obtained based on the AI module may be transmitted to the refrigerator via the network 40 to be displayed on the display unit 21 or displayed on the display unit 21 or on the user terminal 30 communicatively connected to the refrigerator 10.

Alternatively, a user can directly input foods to be stored and an expiration date by using the display unit 21 of the refrigerator 10 or the user terminal 30 as an interface. For this purpose, for example, the refrigerator 10 provides a user interface for inputting foods to be stored to the display unit 21, and the user can register the food to be stored and the expiration date in the refrigerator 10 through the user interface. The user interface may include, for example, a touch screen integrated with the display unit, a voice recognition module, a gesture recognition module and the like, which are hereinafter collectively referred to as a user input unit.

In the case of using the user terminal 30, a process of connecting the user terminal 30 to the refrigerator 10 may be first performed. In this case, the user terminal 30 and the refrigerator 10 may be connected to each other via the network 40, but more preferably, may be connected to each other via WiFi or Bluetooth for short range communication.

If the user terminal 30 is connected to the refrigerator 10 via the network 40, the user may input the food to be stored and the expiration date through the user interface provided on the user terminal 30 and transmit the information to the refrigerator 10 via the network 10.

Alternatively, it is also possible to input the food to be stored to the refrigerator through the voice recognition based on a speaker's voice which is received through a microphone (not illustrated) installed outside the refrigerator 10, and obtain the registration information by performing data processing on the received voice based on the speech recognition.

Meanwhile, in the present invention, the registration information may be obtained through a bar code. Here, the bar code refers to a code which can be optically read by being represented by a combination of vertical bars having different thicknesses.

FIG. 10 shows an example of a bar code displayed on a receipt.

As illustrated in FIG. 10, the receipt includes a bar code printed corresponding to each food item, and the bar code may preferably be recorded with an expiration date of food in a coded form, along with an item number capable of identifying a name of food.

Since the receipt includes such a bar code, according to the present invention, a user can register the receipt in the refrigerator 10 or the user terminal 30 or register the registration information of the corresponding food in the refrigerator 10 using the optical scanner which is installed in a hardware form.

On the other hand, in one example, the case where the bar code is included in the receipt is exemplified, but the present invention is not limited thereto. Therefore, the bar code may be provided in various forms such as a wrapping paper of food and a surface of food.

Figure 11:
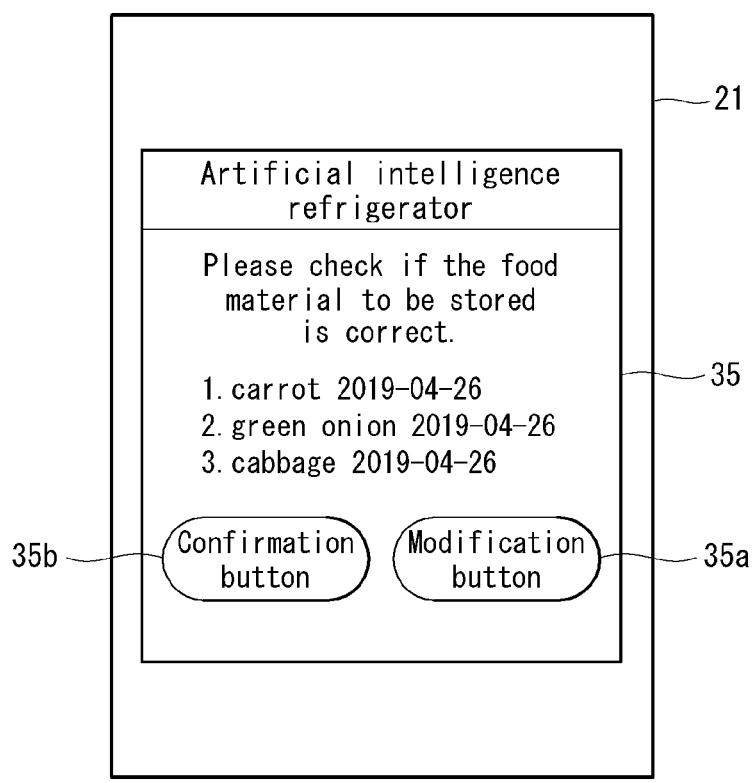
FIG. 11 is a diagram illustrating a confirmation message displayed on the user terminal.

FIG. 11 is a diagram illustrating an example of a confirmation message transmitted to a user when food is registered in the refrigerator.

When the user registers the food to be stored in the refrigerator 10 as described above, the refrigerator 10 completes the process of acquiring the registration information (S1000) by transmitting a confirmation message 35 to the user. This process is not necessarily required for the present invention, and the registration information may be directly stored without the confirmation process when the registration information is acquired.

On the other hand, FIG. 11 illustrates that the confirmation message 35 is displayed on the display unit 21 of the refrigerator 10, but the confirmation message may likewise be transmitted to the user terminal communicatively connected to the refrigerator.

The confirmation message 31 may be input through the user input unit, or the image obtained through the camera 31 may be provided in a list form by connecting foods based on the information recognized by the AI module to an expiration date of each food.

In addition, the confirmation message 31 may further include a confirmation button 35b and a modification button 35a. When the confirmation button 35b is selected, the data displayed in the confirmation message 31 may be stored in the memory as the registration information as it is. When the modification button 35a is selected, the processor 14 can store the modification data input through the user input unit in the memory as the registration information.

Figure 12:
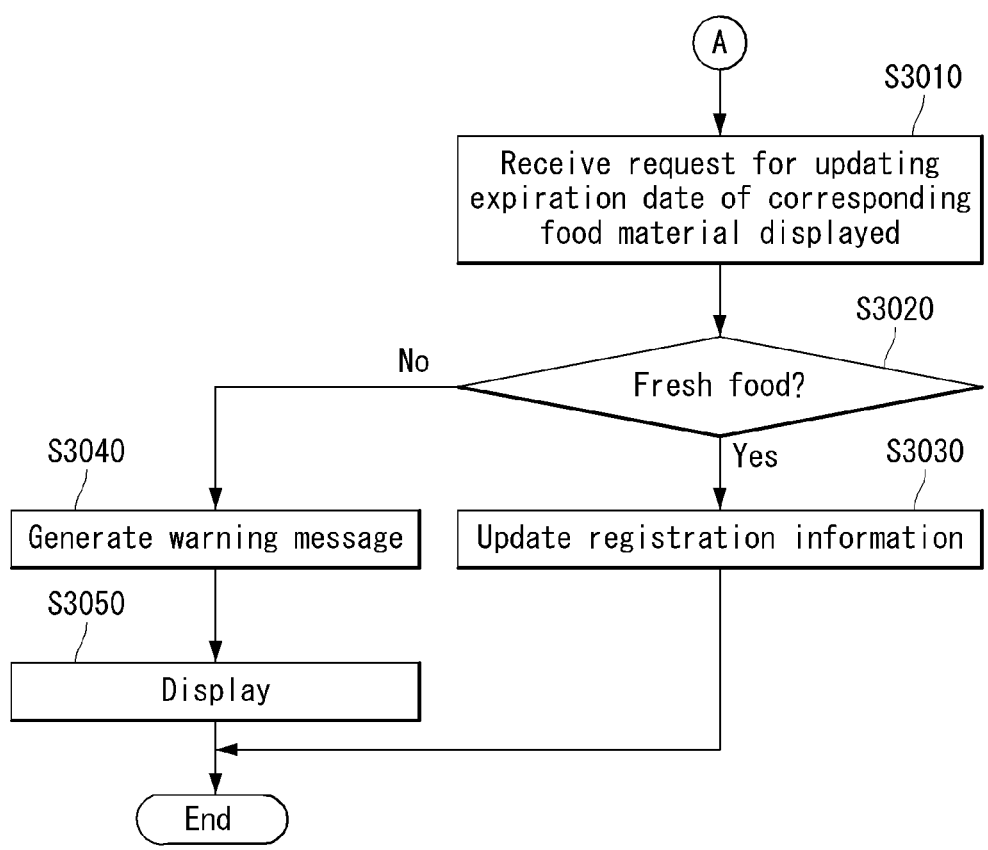
FIG. 12 is a diagram illustrating a process of updating an expiration date of registered foods.

The expiration date of the registered food can be updated (updated) by the user's selection. FIG. 12 illustrates a process of updating an expiration date, and FIG. 13 illustrates a screen on which an alarm is provided to the registered user as a notification message.

The processor 14 may be operated to periodically compare the expiration date of the stored foods with the current date based on the registration information stored in the memory so as to visually indicate an alarm for the corresponding food which is smaller than the set threshold value among the stored foods.

In one example, the alarm may be provided to a user in a message form, and FIG. 13 illustrates an example of the notification message 37. The notification message 37 may be displayed through the user terminal 30 or the display unit 21 of the refrigerator 10, and FIG. 13 shows, for example, the appearance that the message 37 is displayed on the display unit 21.

The notification message 37 may include the stored foods and the expiration date of the stored food, and may also include the storage method associated with the stored foods, and additional information such as a tip for increasing the number of storage methods. In addition, the notification message 7 may further include the modification button 37a for updating the expiration date.

When the modification button 37a is selected, the user input unit for modifying a date can be additionally provided, and the expiration date of the corresponding food can be modified to the date modified through the user input unit.

When the request for updating the expiration date is received (S3010), the refrigerator 10 determines whether the corresponding food whose expiration date is requested to be modified is a food whose expiration date can be updated (S3020). In one example of the present invention, the expiration date of foods which are easily corrupted like fresh foods such as vegetables and fruits, meat foods such as pork, beef, and chicken, and fish foods such as mackerel and spanish mackerel can be set not be updated, and foods which are not easily corrupted like grain foods such as rice and potato can be set to be updated.

According to the determination in step S3020, if food can be updated, the expiration date of the corresponding food is updated to the updated date, and the registration information is updated. In one preferred form, a step of determining whether the expiration date of the corresponding food can be updated according to the updated expiration date may be further provided.

Figure 14:
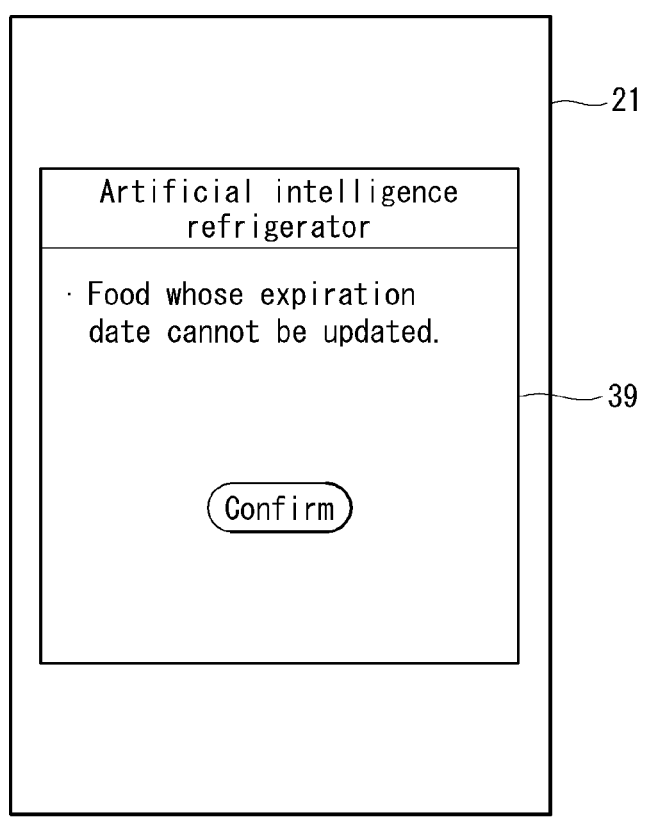
FIG. 14 is a diagram illustrating a warning message displayed on the user terminal.

If it is determined in step S3020 that the food cannot be updated, the refrigerator 10 generates a warning message notifying that the expiration date of the corresponding food cannot be updated (S3040) and the warning message (39 in FIG. 14) may be displayed on the display unit.

Figure 15:
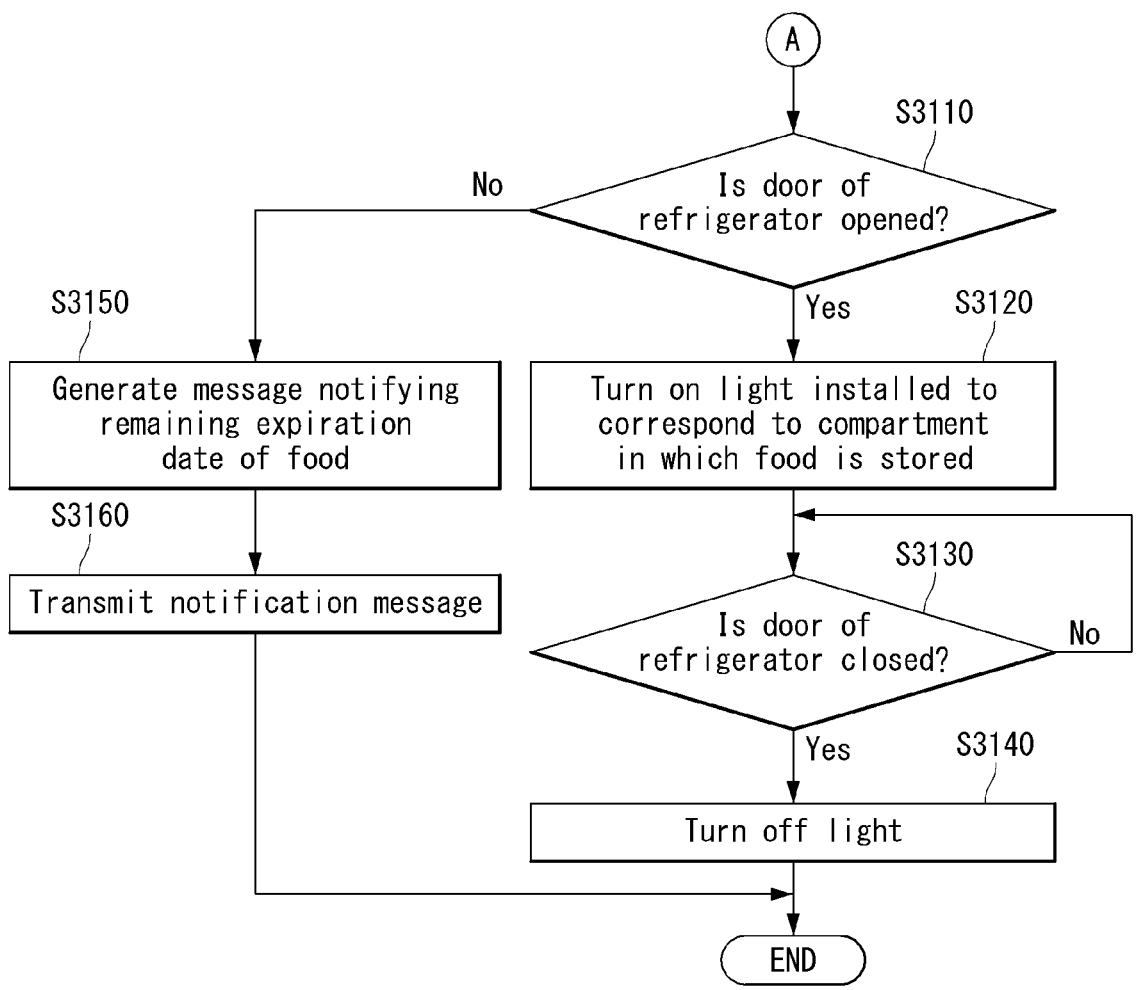
FIG. 15 is a diagram illustrating a process of visually indicating an alarm.

In another example of the present invention, the alarm can be indicated using the light installed in the refrigerator, which will be described with reference to FIG. 15.

In step S3110, the refrigerator 10 can determine whether the doors 20 and 30 are opened based on the information collected from various sensors installed. In one example, it may be determined that doors 20 and 30 are opened based on information obtained by a position sensor, a light sensor, or a combination thereof.

As the determination result, if the doors 20 and 30 are opened, the lights installed to correspond to the compartments in which the corresponding food is stored can be identified and the corresponding lights can be turned on to visually indicate the alarm. The position of the corresponding food can be obtained through the analysis of the image photographed when the doors 20 and 30 are opened or the position of the corresponding food may also be confirmed by detecting a change in the load of the compartment in which the corresponding food is stored.

On the other hand, the light may be displayed in different colors depending on the remaining expiration date of the corresponding food. For example, when 3/1 of the expiration date elapses, the light emits light in yellow, and when 2/3 of the expiration date elapses, the light may emit light in red.

Thereafter, if it is determined in step S3130 that the doors 20 and 30 of the refrigerator 10 are closed, the light is controlled to be turned off (S3140).

On the other hand, if it is determined in step S3110 that the doors 20 and 30 of the refrigerator 10 are not opened, the notification message 37 described with reference to FIG. 13 is generated (step S3150), and the generated notification message 37 may be displayed on the user terminal 30 of the user or the display unit 21 of the refrigerator 10 (S3160).

The foregoing detailed description should not be construed as being limited in all aspects and should be considered as being exemplified. The scope of the present invention should be determined by rational interpretation of the appended claims, and all changes within the scope of equivalents of the present invention are included in the scope of the present invention.

The invention claimed is:

1. A method of controlling an intelligent refrigerator, the method comprising:
   obtaining registration information of food comprising an expiration date;
   storing the registration information;
   comparing an expiration date of foods stored in the intelligent refrigerator with a current date based on the registration information and visually indicating an alarm on the food, if the remaining days to the expiration date are smaller than a predetermined threshold value,
   wherein the registration information is obtained through at least one of a photographed image of the food, data input through a bar code, or data obtained through an external system that manages distribution information of the food,
   wherein the intelligent refrigerator comprises a plurality of storage boxes for separately storing the food and an indicator installed between the plurality of storage boxes so as to guide a receiving position of the storage box,
   wherein the visually indicating of the alarm comprises controlling to turn on the indicator based on the remaining days, and
   wherein the indicator is controlled to turn on when the storage box is deviated from the receiving position, and turn off when the storage box is positioned at the receiving position;
   receiving a user's authentication information and performing user authentication of comparing the user's authentication information with user's authentication information registered in advance to correspond to each of the storage boxes; and releasing lock of a door of the intelligent refrigerator and the storage box corresponding to the authenticated user according to the user authentication.

2. The method of claim 1, wherein the expiration date is set to a value input through a user input unit when the expiration date is not determined in the image.

3. The method of claim 1, wherein the bar code is included in wrapping paper of the food or a receipt in which a purchase history of the food is recorded.

4. The method of claim 1, wherein the obtaining of the registration information comprises:
obtaining data comprising a name and the expiration date of the food;
displaying the obtained data in a display unit of the intelligent refrigerator; and
receiving an input of modified data in which the obtained data are modified through a user input unit of the intelligent refrigerator to store the modified data as the registration information in a memory.

5. The method of claim 1, further comprising:
receiving a request for updating the expiration date of the food in which the alarm is displayed through a user input unit;
determining whether the expiration date of the food can be updated; and
changing the expiration date of the food to the requested date based on the determining.

6. The method of claim 1, wherein the visually indicating of the alarm comprises detecting opening of a door of a storage in which the food is stored and turning on a light installed in the storage.

7. The method of claim 6, wherein the storage is partitioned into a plurality of storage compartments partitioned by shelves, and
wherein a light installed to correspond to a storage compartment in which the food is stored among a plurality of lights installed to correspond to each of the plurality of storage compartments is selectively turned on.

8. The method of claim 6, wherein the light is turned on with different colors based on the remaining days of the food.

9. The method of claim 1, wherein the predetermined threshold value is differently set based on at least one of a kind of the food, a consumption speed of the food, and a weight of the food.

10. An intelligent refrigerator for storing food, the intelligent refrigerator comprising:
a memory configured to store data; and
a processor configured to control an operation of the intelligent refrigerator,
wherein the processor is configured to:
obtain registration information of food comprising an expiration date,
store the registration information in the memory, and
compare an expiration date of foods stored in the intelligent refrigerator with a current date based on the registration information and visually indicate an alarm of the food, if the remaining days to the expiration date are smaller than a predetermined threshold value,
wherein the registration information is obtained through at least one of a photographed image of the food, data input through a bar code, or data obtained through an external system that manages distribution information of the food,
wherein the intelligent refrigerator comprises a plurality of storage boxes for separately storing the food and an indicator installed between the plurality of storage boxes so as to guide a receiving position of the storage box,
wherein the visually indicating of the alarm comprises controlling to turn on the indicator based on the remaining days,
wherein the indicator is controlled to turn on when the storage box is deviated from the receiving position, and turn off when the storage box is positioned at the receiving position, and
wherein the processor is further configured to:
receive a user's authentication information and perform user authentication of comparing the user's authentication information with user's authentication information registered in advance to correspond to each of the storage boxes, and
release lock of a door of the intelligent refrigerator and the storage box corresponding the authenticated user according to the user authentication.

11. The intelligent refrigerator of claim 10, further comprising:
a user input unit, wherein the expiration date is set to a value input through the user input unit when the expiration date is not determined in the image.

12. The intelligent refrigerator of claim 10, wherein the bar code is included in wrapping paper of the food or a receipt in which a purchase history of the food is recorded.

13. The intelligent refrigerator of claim 10, further comprising:
a user input unit; and
a display unit,
wherein the processor obtains the registration information by:
obtaining data comprising a name and the expiration date of the food,
displaying the obtained data in the display unit, and
receiving an input of modified data in which the obtained data are modified through the user input unit to store the modified data as the registration information in the memory.

14. The intelligent refrigerator of claim 10, further comprising:
a user input unit,
wherein the processor is further configured to:
receive a request for updating the expiration date of the food in which the alarm is displayed through the user input unit,
determine whether the expiration date of the food can be updated, and
change the expiration date of the food to the requested date based on the determination.

15. The intelligent refrigerator of claim 10, wherein the visually indicating of the alarm comprises detecting opening of a door of a storage in which the food is stored and turning on a light installed in the storage.

16. The intelligent refrigerator of claim 15, wherein the storage is partitioned into a plurality of storage compartments partitioned by shelves, and
wherein a light installed to correspond to a storage compartment in which the food is stored among a plurality of lights installed to correspond to each of the plurality of storage compartments is selectively turned on.

17. The intelligent refrigerator of claim 15, wherein the light is turned on with different colors based on the remaining days of the food.

18. The intelligent refrigerator of claim 15, wherein the predetermined threshold value is differently set based on at least one of a kind of the food, a consumption speed of the food, and a weight of the food.

\* \* \* \* \*